(12) United States Patent
Specht et al.

(10) Patent No.: US 6,572,140 B2
(45) Date of Patent: Jun. 3, 2003

(54) DEVICE FOR REGULATING INFLATION OF AN AIRBAG

(75) Inventors: Martin Specht, Feldafing (DE); Rudolf Meyer, Odelzhausen (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/895,747

(22) Filed: Jun. 29, 2001

(65) Prior Publication Data

US 2002/0030354 A1 Mar. 14, 2002

(30) Foreign Application Priority Data

Sep. 12, 2000 (DE) .......................... 100 45 035

(51) Int. Cl.[7] .......................... B60R 21/26; B60R 21/28
(52) U.S. Cl. ....................................... 280/736; 280/742
(58) Field of Search ................................. 280/742, 736, 280/741, 740, 738

(56) References Cited

U.S. PATENT DOCUMENTS

| | | | | |
|---|---|---|---|---|
| 5,003,887 A | * | 4/1991 | Unterforsthuber et al. | 102/531 |
| 5,707,078 A | | 1/1998 | Swanberg et al. | 280/739 |
| 5,851,029 A | * | 12/1998 | Klinger et al. | 222/54 |
| 6,022,045 A | * | 2/2000 | Faigle | 280/736 |
| 6,113,134 A | * | 9/2000 | Lim | 180/282 |
| 6,123,358 A | * | 9/2000 | Ryan et al. | 280/739 |
| 6,168,199 B1 | * | 1/2001 | Faigle | 280/736 |
| 6,213,502 B1 | * | 4/2001 | Ryan et al. | 280/736 |
| 6,227,567 B1 | * | 5/2001 | Ross | 280/737 |
| 6,241,279 B1 | * | 6/2001 | Ochiai | 280/735 |
| 6,247,726 B1 | * | 6/2001 | Ryan | 280/738 |
| 6,371,517 B1 | * | 4/2002 | Webber et al. | 280/730.1 |
| 6,431,596 B1 | * | 8/2002 | Ryan et al. | 280/739 |
| 6,439,603 B2 | * | 8/2002 | Damman et al. | 280/736 |

FOREIGN PATENT DOCUMENTS

| | | | |
|---|---|---|---|
| DE | 19519678 | 12/1996 | |
| DE | 19839283 | 3/2000 | |
| EP | 0812741 A | 12/1997 | |
| EP | 0812741 B1 | 12/1997 | |
| EP | 0917966 | 5/1999 | |
| JP | 6199202 A | * 7/1994 | B60R/21/26 |
| WO | 9942340 | 8/1999 | |
| WO | 0043242 | 7/2000 | |

* cited by examiner

Primary Examiner—Paul N. Dickson
Assistant Examiner—Joselynn Y Sliteris
(74) Attorney, Agent, or Firm—Lonnie Drayer; Jarett Rieger

(57) ABSTRACT

A device for regulating the amount of inflation gas supplied to an airbag of a motor vehicle has a cylindrical member with at least one inflation aperture therethrough. An adjustable annular shutter with at least one shutter aperture is rotatably mounted around the axis of the cylindrical member. The amount of inflation gas which is supplied via the inflation aperture is adjustable through alignment of the shutter aperture with the inflation aperture.

14 Claims, 7 Drawing Sheets

DEVICE FOR REGULATING INFLATION OF AN AIRBAG

FIELD OF THE INVENTION

The present invention relates to a device for inflating an airbag of a motor vehicle and regulating the amount of inflation gas supplied to an airbag.

DISCUSSION OF THE PRIOR ART

EP 0 812 741 B1 teaches a device for regulating the amount of inflation gas supplied to an airbag of a motor vehicle comprising inflation apertures in several cylindrical members. An adjustable shutter can open the cross section of the apertures completely or partially. The adjustment of the aperture cross section of each inflation aperture is dependent on the position of the vehicle occupant to be protected or on objects such as children's seats and the like that are located in the path of the airbag when it is deployed.

SUMMARY OF THE INVENTION

There is provided in accordance with one aspect of the present invention a device for regulating the amount of inflation gas supplied to an airbag of a motor vehicle. The device has a cylindrical member with at least one inflation aperture therethrough. An annular shutter having at least one shutter aperture is rotatable around the axis of the cylindrical member such that the amount of inflation gas which is supplied via the at least one inflation aperture is adjustable. The at least one shutter aperture has an aperture cross section that corresponds to the aperture cross section of the at least one inflation aperture. The aperture cross section of the at least one shutter aperture can be completely or partly aligned with the cross section of the aperture of the at least one inflation aperture.

There is provided in accordance with another aspect of the present invention a device for regulating the amount of inflation gas supplied to an airbag of a motor vehicle comprising an inflation head attached to a substantially cylindrical-shaped vessel containing an inflation gas. The inflation head directs the inflation gas exiting from the vessel towards the interior of the airbag. The inflation head has a cylindrical inflation head casing with at least one inflation aperture therethrough. An adjustable annular shutter having at least one shutter aperture therein is rotatable around the axis of the cylindrical inflation head casing such that the amount of inflation gas which is supplied via the at least one inflation aperture is adjustable. The at least one shutter aperture has an aperture cross section that corresponds to the aperture cross section of the at least one inflation aperture, whereby the aperture cross section of the at least one shutter aperture can be completely or partially aligned with the cross section of the aperture of the at least one inflation aperture.

DETAILED DESCRIPTION OF THE INVENTION

Figure 1:
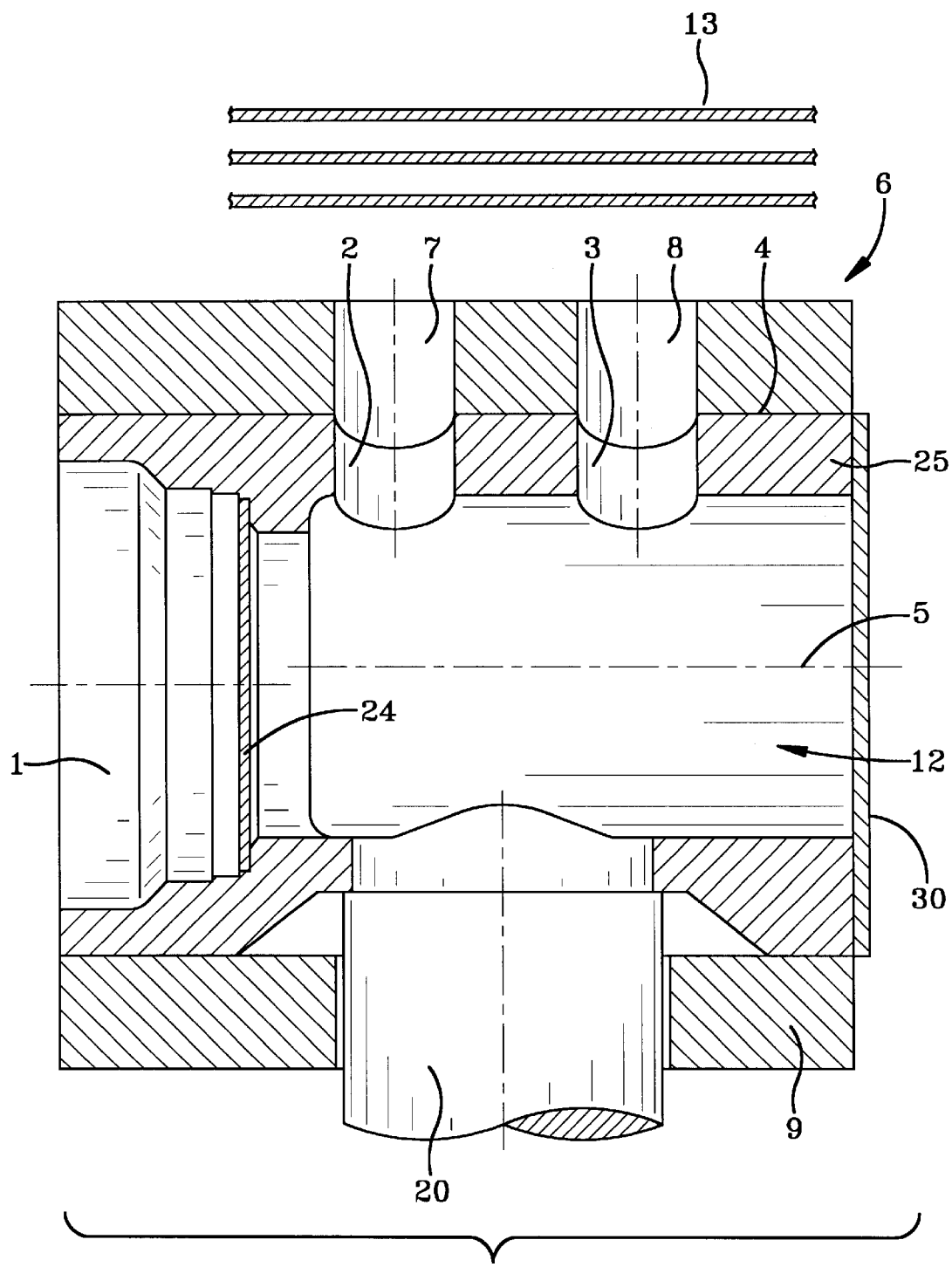
FIG. 1 is a longitudinal section of a device for regulating the amount of inflation gas supplied to an airbag of a motor vehicle.
Figure 2:
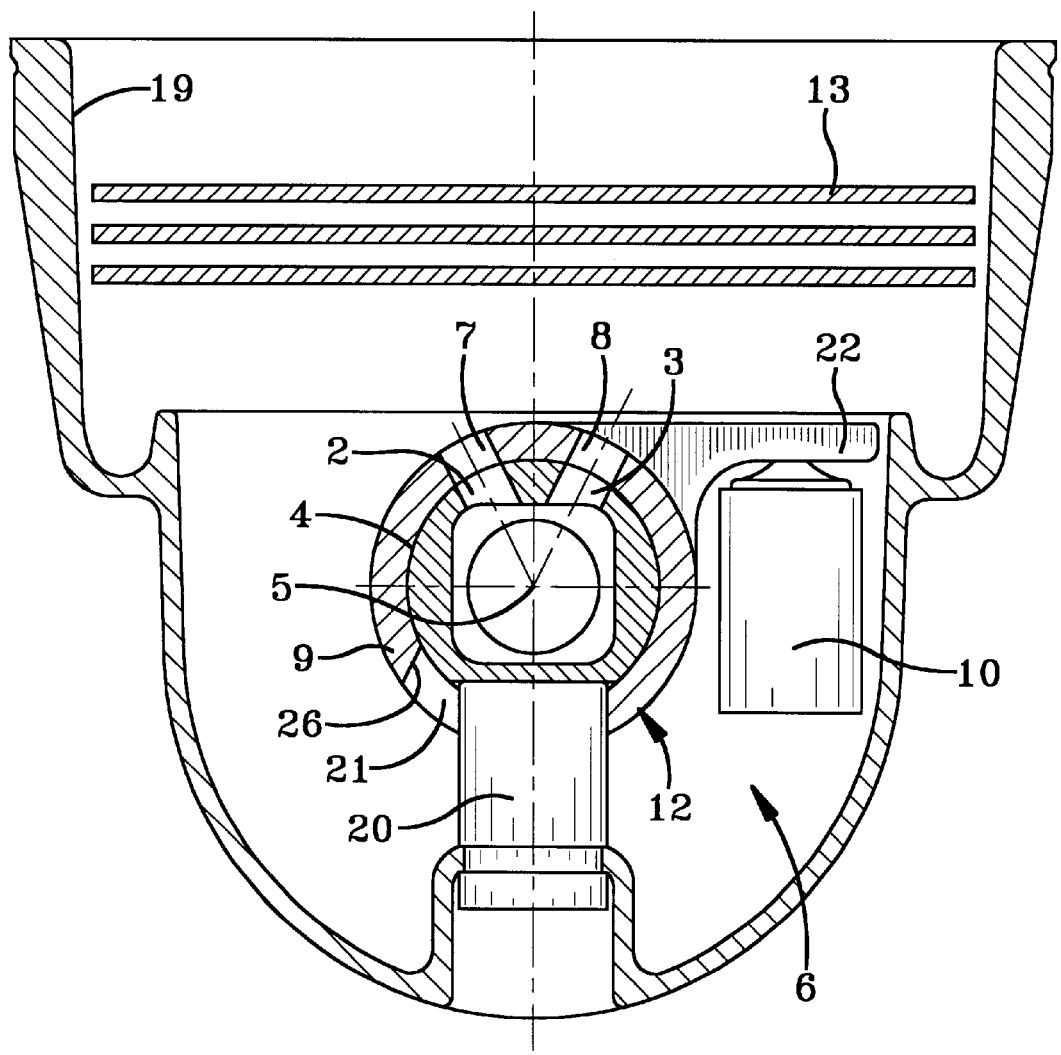
FIG. 2 is a cross-sectional view of the embodiment of FIG. 1 in its normal operating configuration when an airbag has not yet been inflated.
Figure 6:
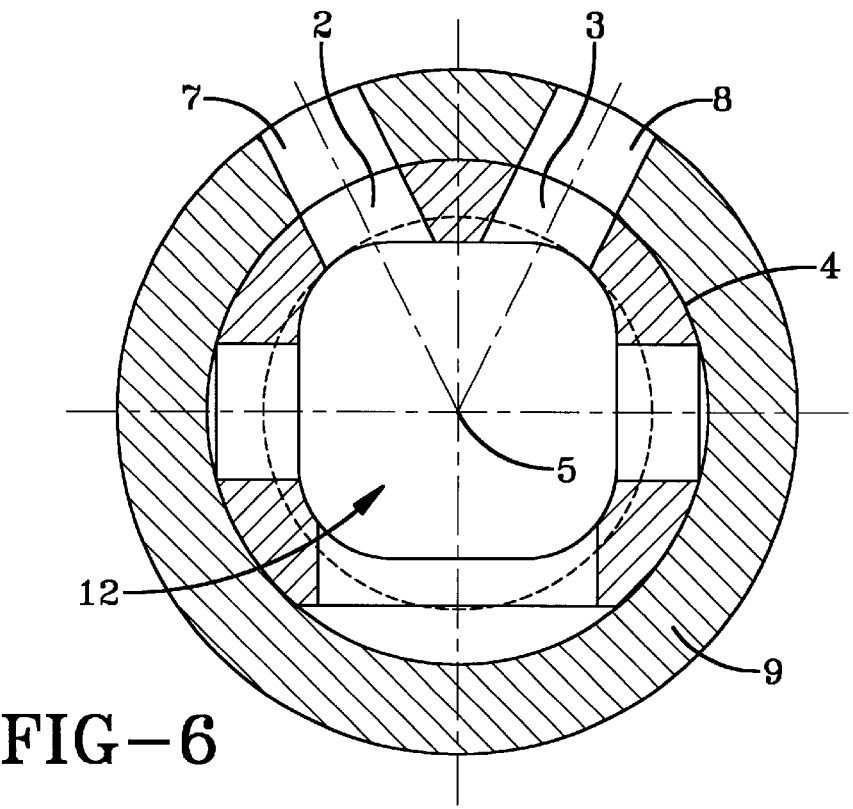
FIG. 6 is a cross-sectional representation of an inflation head used in the embodiments shown in FIGS. 1 to 5, in the open position.

Each of the embodiments shown in the Figs. has an inflation head 12 that is attached to a vessel 1, preferably a substantially cylindrical-shaped vessel, containing inflation gas, which is shown only in FIG. 1. The inflation head can be connected to the source of inflation gas using a weld joint. Under normal driving conditions, the source of inflation gas 1, which is preferably a cylindrical-shaped storage vessel containing cold gas, is closed by a sealing disk 24. The inflation gas preferably comprises a gas such as helium or argon, or a mixture of both such gases, stored at a high pressure of, for instance, approximately 600 bar. The inflation head directs the inflation gas exiting from the storage vessel towards the interior of the airbag The inflation head 12 comprises a cylindrical inflation head casing 25, which is a cylindrical member that has a cylindrical exterior surface 4. A closure 30 is located at the end of the inflation head casing that is distal from the gas storage vessel 1. An annular shutter 9 is rotatably mounted on the cylindrical exterior surface of the inflation head casing. During normal driving conditions the annular shutter 9 is arranged on the outer cylindrical surface of the inflation head with a press fit. As shown in FIGS. 1, 2 and 6, the shutter apertures 7, 8 in the annular shutter 9 are aligned with inflation apertures 2, 3 in the inflation head casing 25. In the represented embodiment, four inflation apertures 2, 3 and four corresponding shutter apertures 7, 8 can be provided. As shown in the Figs. the cross sections of the inflation apertures 2, 3 and the shutter apertures 7, 8 are the same. It is preferable that the inflation apertures 2, 3 and the shutter apertures 7, 8 are radially and axially aligned in relation to an axis 5 of the cylindrical inflation head casing 25. The inflation apertures and shutter apertures are directed towards the interior of an airbag 13, which under normal driving conditions is folded and located in a housing 19 as shown in FIG. 2.

When a shutter aperture 7, 8 and a corresponding inflation aperture 2, 3 are aligned with one another, the entire cross section of the inflation aperture is completely opened towards the interior of the airbag. Each shutter aperture can be moved to completely, or partially, close the corresponding inflation aperture. The position of the shutter aperture with respect to the corresponding inflation aperture preferably depends on the position of the vehicle occupant to be protected or on an object, such as child's seats, that is located in the path of deployment of the airbag. The position of the vehicle occupant can be detected in a known manner by position sensors. It is also possible to carry out an advance movement sensing of the airbag simultaneously to the inflation process of the airbag and to complete the inflation process by closing the respective inflation aperture in dependence on the sensed free path length. Such a sensing process is known from EP 0 812 741 A1.

Under normal driving conditions, each inflation aperture 2, 3 and its corresponding shutter aperture 7, 8 are substantially perfectly aligned with one another to ensure a total opening of each inflation aperture. In a crash the sealing disk 24 of the source of inflation gas 1 is opened by an activated energy store that is preferably a pyrotechnic device 20, so that the inflation gas can discharge into the inflation head 12 and from there via the inflation apertures 2, 3 and shutter apertures 7, 8, which are aligned with each other, into the interior of the airbag. The discharge direction of the inflation gas is in this case diverted by approximately 90°. An example of a suitable pyrotechnic device 20 that may be used in the practice of the present invention is disclosed in commonly owned U.S. patent application Ser. No. 09/785, 856 filed Feb. 16, 2001 and corresponding German priority application 10063093.6 filed Dec. 18, 2000, but any suitable vessel opening device may be employed without varying from the scope of the present invention.

Figure 7:
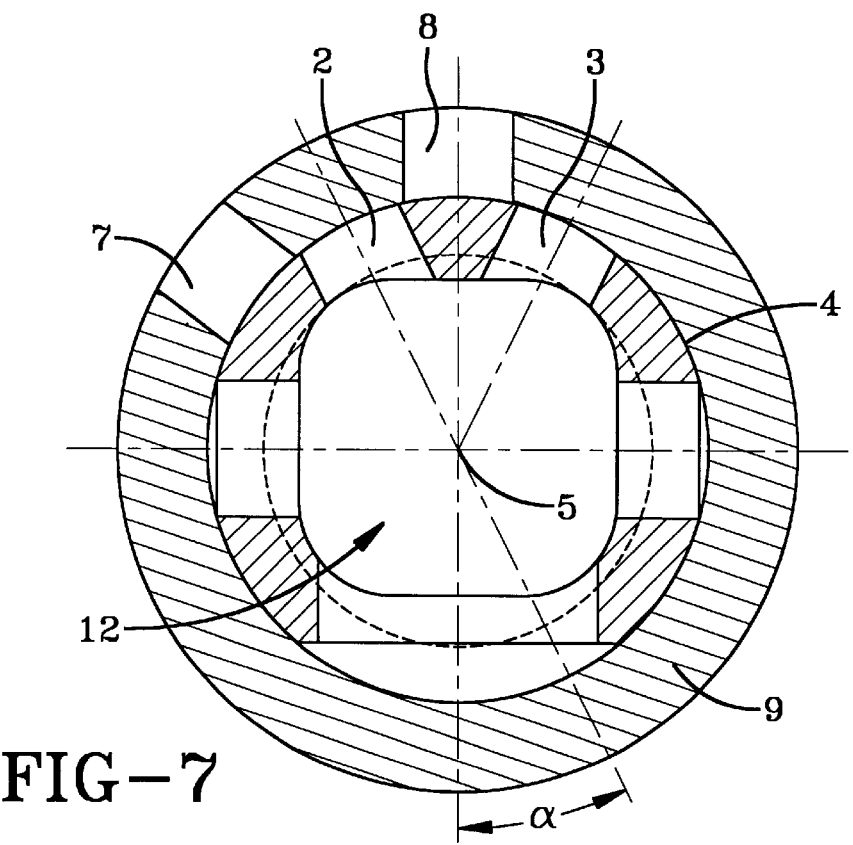
FIG. 7 shows the inflation head represented in FIG. 6 in the closed position.
Figure 8:
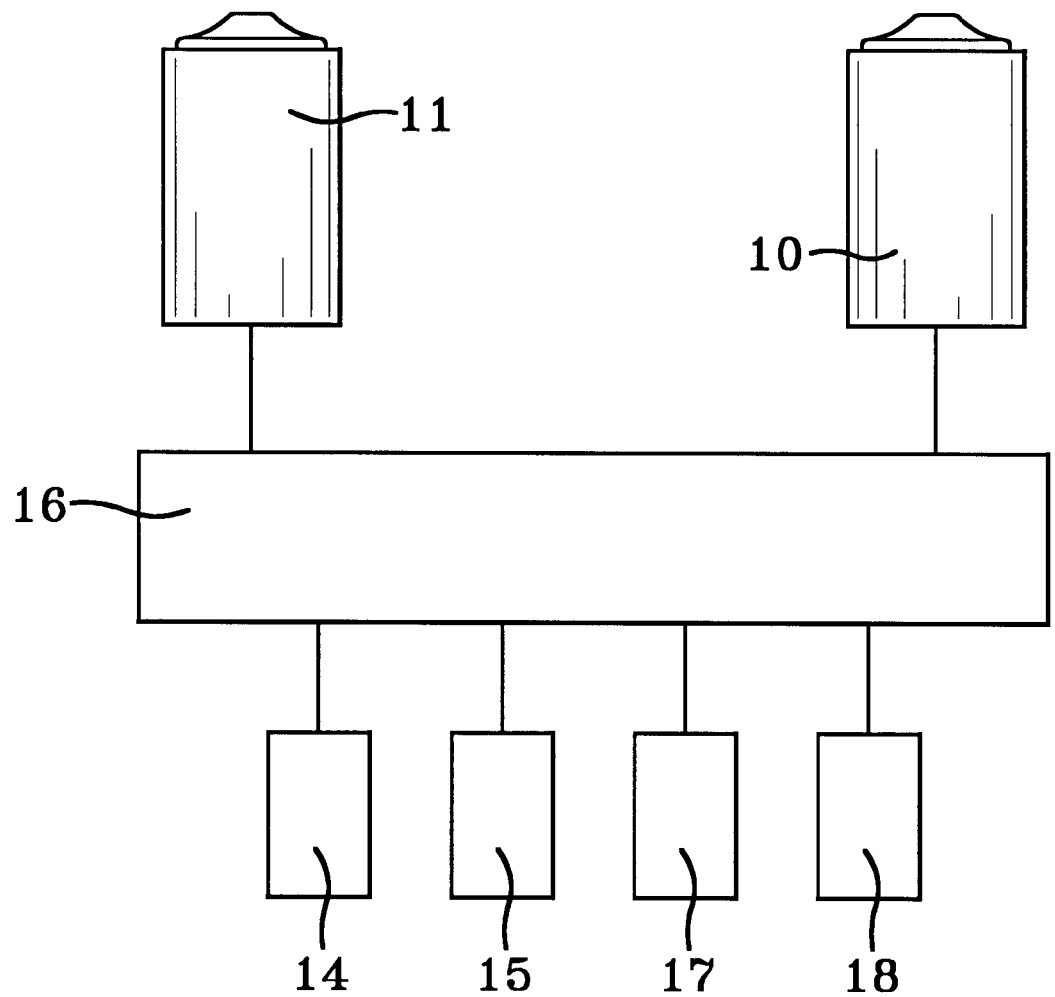
FIG. 8 is a block diagram illustrating the control of both energy stores used in the embodiment shown in FIGS. 4 and 5.

If, during the inflation of the airbag, an impediment exists in its path of airbag deployment, for instance a child's seat or an Out-Of-Position vehicle occupant, the process of inflating the airbag 13 can be prematurely ended by closing the inflation apertures 2, 3. In the represented embodiments, this can be achieved through the activation of an energy store 10. The energy store 10 can comprise an ignitable pyrotechnical propellant that when activated acts upon a lever arm 22 firmly attached to the annular shutter 9. As a result, the shutter is brought from the positions shown in FIG. 2 or 6 to the closing position shown in FIG. 3 or 7, in which the inflation apertures 2, 3 are closed. The annular shutter 9 is then pivoted by an angle α as shown in FIG. 7 around the axis 5 of the cylindrical inflation head 25. A short-term or pulsed control of the shutter position is thus achieved. The advance movement sensing can take place with the help of a corresponding advance movement sensing device 18, as shown in FIG. 8, which is connected to a control device 16 for the energy store 10. The advance movement sensing device 18 can be designed in the manner known from EP 0 812 741 A1 or U.S. Pat. No. 6,129,379.

An Out-Of-Position vehicle occupant can be identified in a known manner using one or several position sensors 17. This allows the amount of gas needed to fill the airbag 13 to be predicted, and the closing movement of the annular shutter 9 through the corresponding control of the energy store 10 to be initiated after a predetermined time. To bring the annular shutter 9 into a precise closing position, the annular shutter can have an annular recess 21, the boundary of which comprises an abutment 26 that is fitted to the side boundary of the pyrotechnic device 20, when the annular shutter 9 pivots around the pivoting angle α, shown in FIG. 7, into the closing position, shown in FIG. 3.

Figure 3:
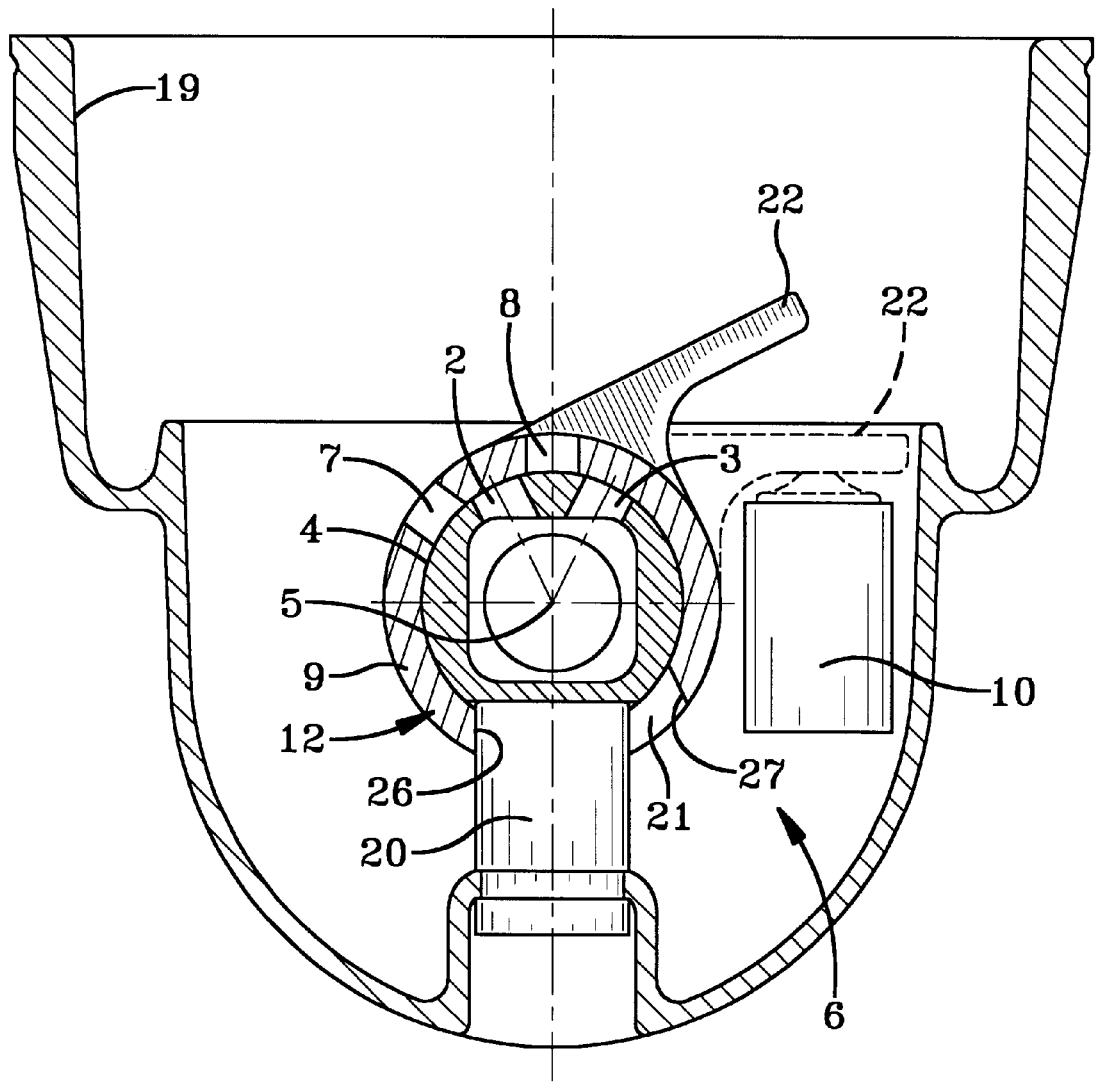
FIG. 3 is a cross-sectional sectional view of the embodiment of FIG. 1 with the inflation device in a closed configuration after inflating an airbag.
Figure 4:
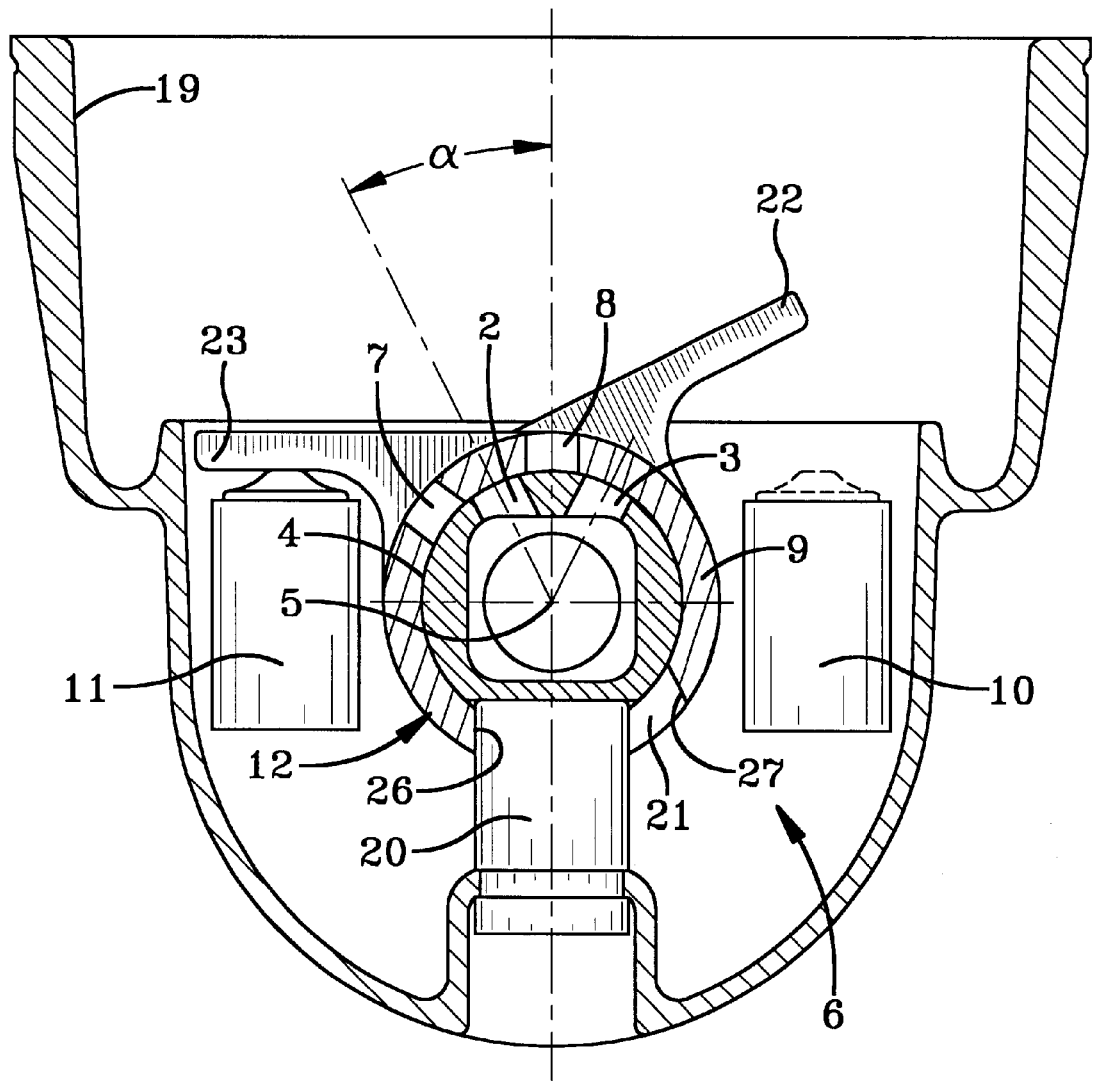
FIG. 4 is a cross-sectional view of a further embodiment of the invention, having two energy stores for the shutter control, after a first inflation of an airbag.
Figure 5:
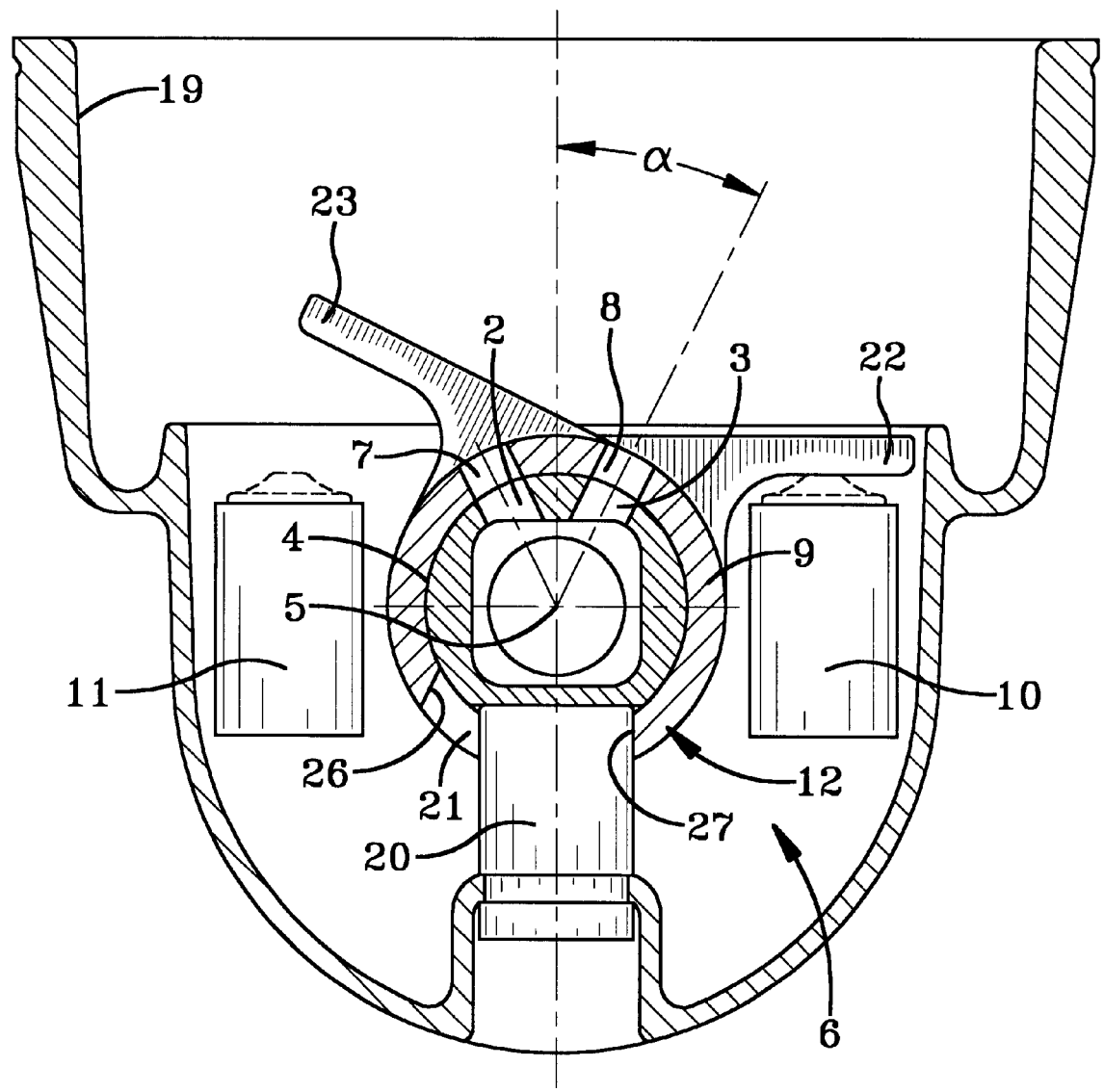
FIG. 5 shows the embodiment of FIG. 4 in the operating position for a second inflation of the airbag.

In the embodiment shown in FIGS. 2 and 3, the shutter device 6 comprises an energy store 10 to bring the annular shutter 9 into the closing position shown in FIG. 3, whereas in the embodiment shown in FIGS. 4 and 5, the shutter device 6 comprises two energy stores 10, 11. By means of the energy stores 10, 11, the annular shutter 9 is pivoted in opposite directions by the angle α. FIG. 4 shows the closing position of the annular shutter 9. FIG. 5 shows the inflation position of the annular shutter, in which the aperture cross section of the inflation apertures 2, 3 is completely open towards the interior of the airbag. The position represented in FIG. 5 also corresponds to the position assumed by the annular shutter 9 under normal driving conditions. This position can be defined by an end abutment 27 in the annular opening 21 of the annular shutter. The end abutment 27 is fitted to the side of the pyrotechnic device 20, as can be seen in FIG. 5. An abutment of this type can also be employed in the embodiment shown in FIGS. 2 and 3. The length of the arc, along which the aperture 7 of the annular shutter 9 extends, corresponds to the pivoting angle α, within which the annular shutter 9 is moved around the axis 5, between its closing and open position.

The embodiment shown in FIGS. 4 and 5 has special advantages if the vehicle experiences a crash involving multiple impacts. During a first impact the airbag is inflated through the aligned inflation apertures 2, 3 and shutter apertures 7, 8 which assume the position shown in FIG. 5. As mentioned above, the amount of inflation gas that is supplied to the interior of the airbag is calculated with relation to the free length of advance movement of the airbag during inflation and/or on the sitting position of the vehicle occupant measured by sensors. Through the activation of the energy store 10, the annular shutter 9 is brought into the closing position shown in FIG. 4. If during the crash a second impact occurs, the second energy store 11 is activated. This activation can take place as a result of sensor signals of one or several motor vehicle sensors 14, 15 which are connected to the control device 16. The activated energy store 11, which can contain a pyrotechnical propellant, acts upon a second lever arm 23, which is firmly connected to the annular shutter 9. The annular shutter is thus brought back to the open position shown in FIG. 5, so that more inflation gas can be supplied to the interior of the airbag. In the embodiment shown in FIGS. 4 and 5, the inflation gas contained in the vessel 1 under high pressure, for instance 600 bar, and the amount of inflation gas is sufficient to inflate the airbag two times.

The inflated volume of the passenger side airbag equals about 100 to 130 liters. The inflation time within which the inflation volume is achieved with a fully inflated airbag equals 30 to 35 ms. The embodiment shown in FIGS. 4 and 5 is particularly advantageous when during a crash the vehicle sustains several crashes within a short space of time. With this embodiment the inflation of the airbag can be prolonged. In the represented embodiment, the annular shutter 9 and the axis 5 are rotatably mounted. The two lever arms 22, 23, which act as actuating levers, are fixed to the annular shutter, for example by molding on. Both lever arms 22, 23 are arranged around the axis 5 of the annular shutter at a predetermined offset angle of about 180° −α.

It is also possible to provide several lever arms as actuating levers on the annular shutter. Intermediate positions between the maximal actuation angle α can be thereby achieved. For instance, graduated aperture cross sections can be provided for the inflation apertures 2, 3. The inflation time of the airbag can thus be prolonged. The inflation process can furthermore be progressively controlled and be totally or gradually interrupted. Moreover, as mentioned above, the inflation process, for instance in the event of a second crash, can be started anew.

In the represented embodiments, the annular shutter 9 is rotatably mounted around the axis 5. It is of course also possible to arrange this embodiment in such a way that the annular shutter 9 is moved along a helical line on the exterior surface of the inflation head casing 25. To this effect a simple helical guide is to be provided between the screw head casing and the annular shutter.

It is furthermore possible to adjust varying opening degrees of the inflation apertures 2, 3 on the inflation head casing 25 with the help of the represented annular shutter 9.

This is of particular advantage if a gentle airflow is desired for the inflation of the airbag. A dual-stage or multi-stage process can be achieved, whereby energy stores with corresponding graduated ignition or in corresponding amounts are activated to pivot the annular shutter 9 for the continuous enlargement of the corresponding aperture cross section of the inflation apertures 2, 3.

It is further possible to use so-called pre-crash sensor signals that predict the likelihood of a crash to control the aperture cross section of the corresponding inflation aperture. Subject to this, the amount of inflation gas which is to be supplied to the airbag can be preset.

It is understood that the invention is not limited to the particular construction and arrangement of parts herein illustrated and described, but embraces such modified forms thereof as come within the scope of the following claims.

We claim:

1. A device for regulating the amount of inflation gas supplied to an airbag of a motor vehicle comprising a cylindrical member having at least one inflation aperture therethrough, an annular shutter having at least one shutter aperture therein, and at least one energy store that can be activated to adjust the annular shutter, wherein the annular shutter is rotatable around an axis of the cylindrical member such that the amount of inflation gas which is supplied via the at least one inflation aperture is adjustable, the at least one shutter aperture has an aperture cross section that corresponds to the aperture cross section of the at least one inflation aperture, whereby the aperture cross section of the at least one shutter aperture can be completely or partly aligned with the cross section of the aperture of the at least one inflation aperture.

2. The device according to claim 1 wherein each shutter aperture and the corresponding inflation aperture are directed radially outwards with relation to the axis of the cylindrical member.

3. The device according to claim 1 wherein the annular shutter is mounted with a press fit on the cylindrical member under normal driving conditions.

4. The device according to claim 2 wherein the annular shutter is mounted with a press fit on the cylindrical member under normal driving conditions.

5. The device according to claim 1 further comprising at least two energy stores that can be activated by a control device in such a way that after the inflation of the airbag the at least one inflation aperture is closed by the annular shutter rotated by the first activated energy stare and in the event of a subsequent second impact the at least one inflation aperture is reopened by the annular shutter rotated by the second activated energy store.

6. The device according to claim 5 wherein the first energy store can be activated depending on a sensed sitting position of a vehicle occupant.

7. The device according to claim 1 wherein the energy store comprises a pyrotechnic propellent.

8. A device for regulating the amount of inflation gas supplied to an airbag of a motor vehicle comprising an inflation head attached to a substantially cylindrical-shaped vessel containing an inflation gas, the inflation head directs the inflation gas exiting from the vessel towards the interior of the airbag, the inflation head having a cylindrical inflation head casing with at least one inflation aperture therethrough, an annular shutter having at least one shutter aperture therein is rotatable around an axis of the cylindrical inflation head casing such that the amount of inflation gas which is supplied via the at least one inflation aperture is adjustable, wherein the annular shutter is adjusted by the activation of at least one energy store, the at least one shutter aperture has an aperture cross section that corresponds to the aperture cross section of the at least one inflation aperture, whereby the aperture cross section of the at least one shutter aperture can be completely or partially aligned with the cross section of the aperture of the at least one inflation aperture.

9. The device according to claim 8 wherein each shutter aperture and the corresponding inflation aperture are directed radially outwards with relation to the axis of the cylindrical inflation head casing.

10. The device according to claim 8 wherein the annular shutter is mounted with a press fit on the cylindrical inflation head casing under normal driving conditions.

11. The device according to claim 9 wherein the annular shutter is mounted with a press fit on the cylindrical inflation head casing under normal driving conditions.

12. The device according to claim 8 further comprising at least two energy stores that can be activated by a control device in such a way that after the inflation of the airbag the at least one inflation aperture is closed by the annular shutter rotated by the first activated energy store and in the event of a subsequent second impact the at least one inflation aperture is reopened by the annular shutter rotated by the second activated energy store.

13. The device according to claim 12 wherein the first energy store can be activated depending on a sensed sitting position of a vehicle occupant.

14. The device according to claim 8 wherein the energy store comprises a pyrotechnic propellant.

* * * * *